United States Patent [19]

Hazlitt et al.

[11] Patent Number: 5,250,612
[45] Date of Patent: Oct. 5, 1993

[54] POLYETHYLENE FILMS EXHIBITING LOW BLOCKING FORCE

[75] Inventors: Lonnie G. Hazlitt; Pak-Wing S. Chum, both of Lake Jackson; Seema V. Karande, Missouri City; John E. Lastovica, III, Lake Jackson, all of Tex.; Ian M. Munro, Edmonton, Canada

[73] Assignee: The Dow Chemical Company, Midland, Mich.

[21] Appl. No.: 773,375

[22] Filed: Oct. 7, 1991

[51] Int. Cl.⁵ .................. C08L 23/08; C08L 23/20
[52] U.S. Cl. ..................... 525/53; 525/240; 525/320; 525/324; 428/516
[58] Field of Search .............. 525/240, 53, 324, 320; 428/516

[56] References Cited

U.S. PATENT DOCUMENTS

| | | | |
|---|---|---|---|
| 2,770,608 | 11/1956 | Barker et al. | 260/32.6 |
| 3,104,232 | 9/1963 | Clark et al. | 260/32.6 |
| 3,108,981 | 10/1963 | Clark et al. | 260/32.6 |
| 3,170,889 | 2/1965 | Hyson | 260/32.6 |
| 3,205,190 | 9/1965 | Braus et al. | 260/32.6 |
| 3,396,137 | 8/1968 | Wharton | 260/32.6 |
| 3,489,824 | 1/1970 | Anspon | 260/897 |
| 3,491,073 | 1/1970 | Marinak | 524/224 |
| 3,647,738 | 3/1972 | Foster | 260/32.6 |
| 3,914,342 | 10/1975 | Mitchell | 260/897 |
| 3,969,470 | 7/1976 | Spiegelman | 260/897 |
| 4,048,412 | 9/1977 | Caumartin et al. | 526/65 |
| 4,136,072 | 1/1979 | Ladish et al. | 260/27 R |
| 4,269,948 | 5/1981 | Nicco | 525/53 |
| 4,320,088 | 3/1982 | Nicco | 422/134 |
| 4,336,352 | 6/1982 | Sakurai et al. | 525/240 |
| 4,405,774 | 9/1983 | Miwa et al. | 526/348 |
| 4,414,369 | 11/1983 | Kuroda et al. | 526/65 |
| 4,438,238 | 3/1984 | Fukushima et al. | 525/240 |
| 4,530,914 | 7/1985 | Ewen et al. | 502/113 |
| 4,692,501 | 9/1987 | Mineshima et al. | 526/65 |
| 4,792,588 | 12/1988 | Suga et al. | 525/240 |
| 4,792,595 | 12/1988 | Cozewith et al. | 526/348 |
| 4,814,135 | 3/1989 | Heitz | 526/348.2 |
| 4,814,377 | 3/1989 | Joyce | 525/53 |
| 4,874,820 | 10/1989 | Cozewith et al. | 525/240 |
| 4,935,474 | 6/1990 | Ewen et al. | 526/114 |
| 4,937,299 | 6/1990 | Ewen et al. | 526/119 |
| 4,939,217 | 7/1990 | Stricklen | 526/114 |
| 5,026,594 | 6/1991 | Akao | 428/516 |
| 5,047,468 | 9/1991 | Lee et al. | 525/53 |
| 5,079,287 | 1/1992 | Takeshi et al. | 525/240 |

FOREIGN PATENT DOCUMENTS

90/03414  4/1990  PCT Int'l Appl. .

*Primary Examiner*—Carman J. Seccuro, Jr.

[57] ABSTRACT

Film having good blocking properties and low coefficient of friction is prepared without the presence of antiblock additives from certain thermoplastic ethylene interpolymer products. The thermoplastic ethylene interpolymer products have a density of about 0.935 g/ml or less, a melt flow ratio, $I_{10}I_2$, of at least about 8, and at least about 0.5 percent by weight of the interpolymer product has a weight average molecular weight of at least about 1,000,000 grams/mole. The interpolymer products are a blend or composite of ethylene polymers or copolymers and comprise at least a first interpolymer of ethylene with at least one alpha-olefin monomer. Preferably, the interpolymer products have a melt index, $I_2$, of from about 0.1 to about 4 grams/10 minutes. The interpolymer products can be made using discrete polymer blends, or preferably, in a multiple reactor sequence. Blown film made from the interpolymer products is especially useful in grocery sack applications.

6 Claims, 7 Drawing Sheets

FIG. I

EXAMPLE 3

EXAMPLE 8

RESIN A

RESIN B

RESIN C

POLYETHYLENE FILMS EXHIBITING LOW BLOCKING FORCE

FIELD OF THE INVENTION

Films made from broad molecular weight distribution ethylene/alpha-olefin interpolymers are disclosed. The films exhibit low blocking force and low coefficient of friction and are especially useful in making grocery sacks.

BACKGROUND OF THE INVENTION

Films fabricated from linear low density polyethylene (LLDPE) typically have higher coefficients of friction (COF) and exhibit higher blocking force than many resin converters and consumers find acceptable. Blocking force (i.e., unwanted adhesion) is usually measured according to ASTM D 3354, where the film-to-film adhesion is expressed as grams of blocking load which causes two layers of film to separate. Resin converters also often require low COF for their fabrication processes, while consumers desire products exhibiting low block because the sacks, bags, etc. are easier to open. The blocking property of film is generally considered to be unsatisfactory when the blocking force is about 20 grams or more. Resin manufacturers can incorporate additives into their LLDPE polymers to decrease the COF and the block, but this increases their production costs and the additives can adversely affect mechanical film properties such as tensile strength, dart impact, tear, etc. of the film. In addition, the additives can exude to the surface of the film (a phenomena referred to as "bloom") and thereby cause more problems, such as odor and poor adhesion to inks used to print on the surface of the finished product.

In an attempt to improve the physical properties of the film, some converters are making film from high density polyethylene, which, when converted into film, achieves good blocking force without the use of additives, thereby retaining more of the other physical properties. For example, it was reported in Plastics Engineering (August, 1991) that high molecular weight high density polyethylene (HMW-HDPE) is expected to displace LLDPE in trash bag and liner applications, due to the ability of the HWM-HDPE to be made at thinner gauges, while maintaining high film strength and good blocking force, without having to use additives. Films made from HDPE, however, have other problems associated with them, including poorer dart impact strength, high splittiness, higher film stiffness and difficult heat sealing.

In spite of the potential drawbacks of making film from LLDPE, commercial producers have introduced additives into their LLDPE resins in order to reduce block and the COF in films of LLDPE. For instance, silicon dioxide, $SiO_2$, is used as an "antiblock" agent to reduce blocking force and erucamide as a "slip" agent to reduce COF. This is a standard practice in the industry, although various other compounds, blends, etc., may also be used.

Many U.S. Patents disclose various methods of improving slip and block properties of film made from polyethylene. For example, U.S. Pat. No. 2,770,608 claims blends of polyethylene with fatty acid amides as a means of improving both slip and block.

U.S. Pat. No. 3,104,232 discloses blends of polyethylene with N-allyl fatty acid amides as a means of improving slip.

U.S. Pat. No. 3,108,981 discloses the use of N-substituted amides of fatty acids as a means of reducing slip.

U.S. Pat. No. 3,170,889 discloses the use of mono and di-N-alkyl-substituted dicarboxylic acid diamides as a means of reducing both slip and block.

U.S. Pat. No. 3,205,190 discloses blends of elaidamide with polyethylene as a means of reducing both block and slip.

U.S. Pat. No. 3,396,137 discloses the use of N-(2-hydroxyethyl)-cis-13-docosenamide to reduce COF.

U.S. Pat. No. 3,489,824 discloses the copolymerization of various substituted acrylamides as a means to reduce both COF and block.

U.S. Pat. No. 3,647,738 discloses the use of fatty acid amides, N-substituted fatty acids, and hydroxylated derivatives of both to be used to reduce both block and slip.

U.S. Pat. No. 4,136,072 discloses the use of plasticizers blended into polyethylene to reduce block. There appears to be intense interest in reducing block and COF in LLDPE blown films and in these cases, the means to reduce the block and slip is by using an additive.

The current invention avoids all of the problems associated with the introduction of additives into LLDPE, including the additional cost for the additive itself and the necessary equipment to put it into the resin.

SUMMARY OF THE INVENTION

A new film and method of making the film has now been discovered. The film has a low blocking force and low COF and doesn't require any additives to achieve such desirable properties. The new films are prepared from a thermoplastic ethylene interpolymer product having:

a) a melt flow ratio $I_{10}/I_2$, of at least about 8, b) a density of about 0.935 g/ml or less, and c) at least about 0.5 percent by weight of the interpolymer having a weight average molecular weight of at least about 1,000,000 grams/mole.

The interpolymer product is a composite or blend of ethylene interpolymers, typically copolymers or terpolymers of ethylene and one or more alpha-olefin monomers having 3 to 18 carbon atoms.

In another aspect, the invention is a method of preparing interpolymer product pellets having a melt flow ratio, $I_{10}/I_2$, of at least about 8, a density of about 0.935 grams/milliliter or less, and at least about 0.5 percent by weight of the interpolymer product pellets having a weight average molecular weight of at least about 1,000,000 grams/mole for use in making a film having a blocking force of about 30 grams or less without adding antiblock agents, comprising the steps of:

(a) polymerizing ethylene in at least one high molecular weight zone of a reactor at temperatures and pressures sufficient to produce a first polymer, (b) interpolymerizing ethylene and at least a first alpha-olefin in at least one other zone of a reactor at temperatures and pressures sufficient to produce a first interpolymer having a lower molecular weight than the first polymer, (c) combining from about 0.5% and up to about 50% of (a) with the first interpolymer of (b) to form an interpolymer product, (d) extruding the interpolymer product into pellets.

The interpolymer product pellets are subsequently extruded into film. Preferably, the pellets are extruded into a blown or cast film.

Surprisingly, in addition to the desirable COF and low blocking force properties, the new interpolymer products also process more easily on current commercial film fabrication equipment and the film made from the interpolymer products is printable.

Blown film made from the interpolymer product is especially useful in grocery sack applications.

BRIEF DESCRIPTION OF THE DRAWINGS

FIG. 7 is based on data from Examples 1-11 and comparative Resins A, B, and C set forth below.

DETAILED DESCRIPTION OF THE INVENTION

Figure 1:
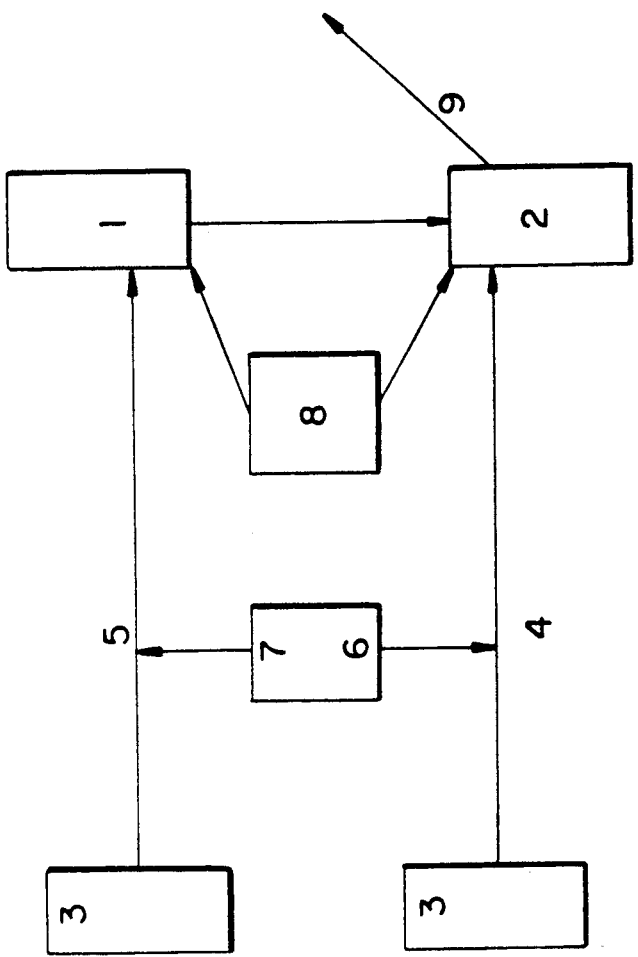
FIG. 1 schematically represents a polymerization flow chart for making interpolymer products of the present invention.
Figure 2:
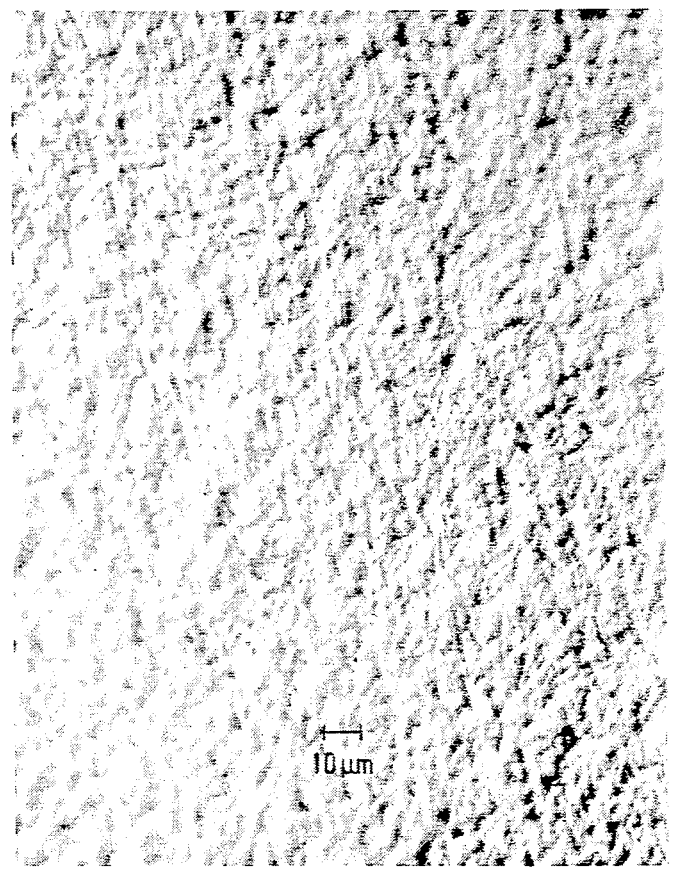
FIG. 2 is a micrograph of film made from Example 3 at 500× magnification.
Figure 3:
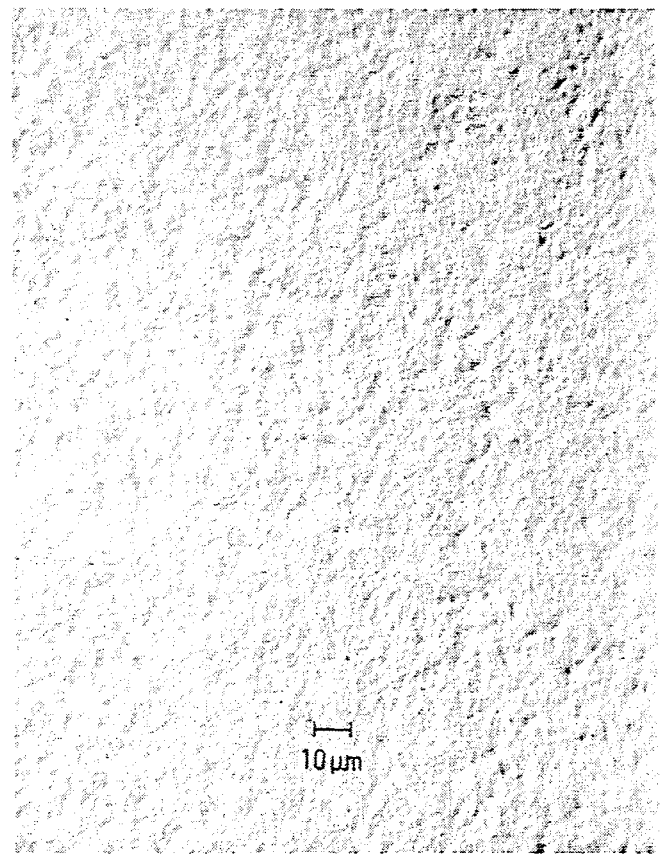
FIG. 3 is a micrograph of film made from Example 8 at 500× magnification.
Figure 4:
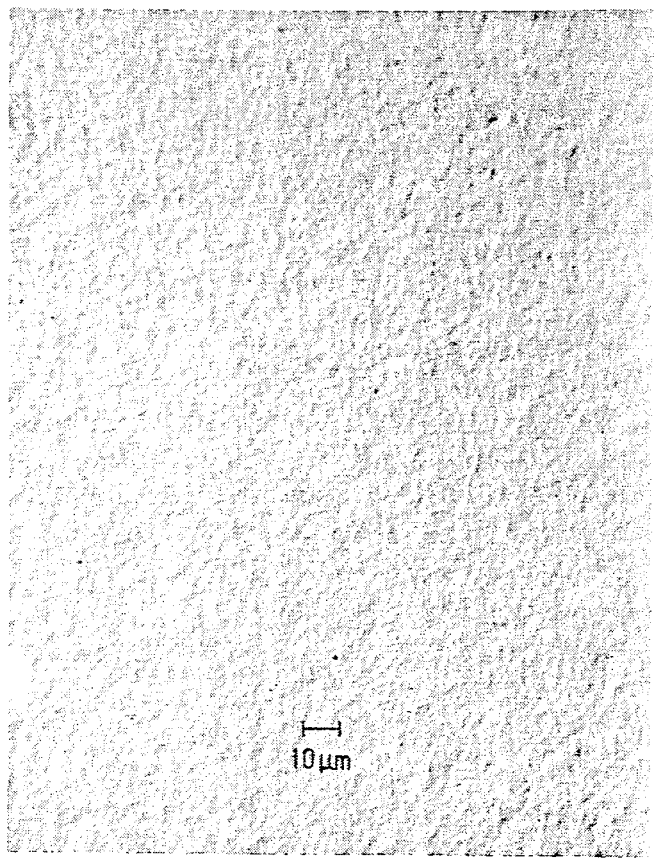
FIG. 4 is a micrograph of film made from Resin A (a comparative example) at 500× magnification.
Figure 5:
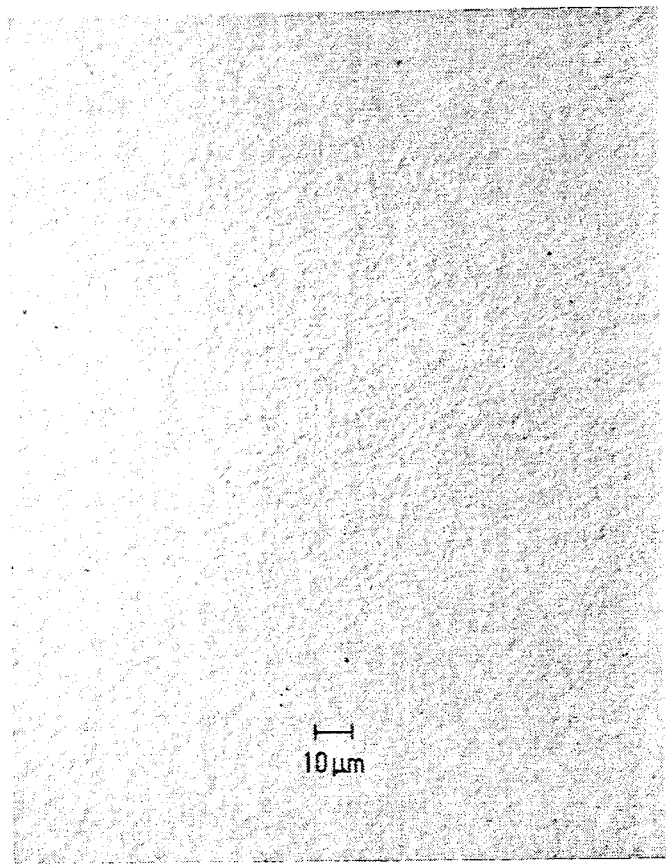
FIG. 5 is a micrograph of film made from Resin B (a comparative example) at 500× magnification.
Figure 6:
FIG. 6 is a micrograph of film made from Resin C containing SiO2 (a comparative example) at 500× magnification.
Figure 7:
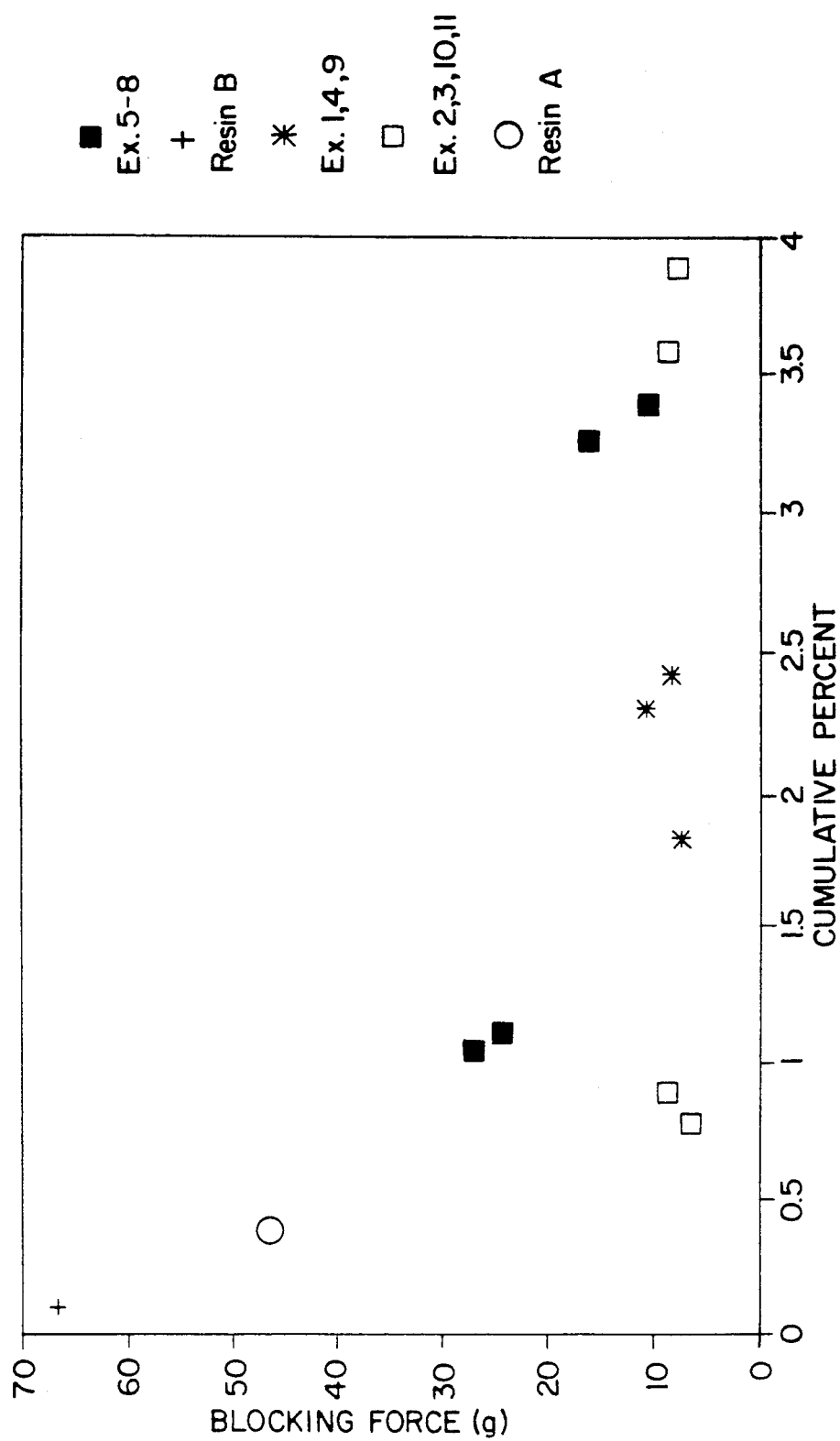
FIG. 7 graphically depicts the relationship between film blocking force and cumulative percent of the interpolymer product having a weight average molecular weight greater than about 1,000,000.

The thermoplastic interpolymer products for use in this invention preferably comprise at least a first interpolymer of ethylene and at least one alpha-olefin. The alpha-olefin is a $C_3$-$C_{18}$ alpha-olefin, particularly a $C_3$-$C_8$ alpha-olefin, and especially $C_8$.

The interpolymer product can further comprise a second interpolymer of ethylene and at least one $C_3$-$C_{18}$ alpha-olefin. The first interpolymer can have the same density as the second interpolymer, but preferably has a density higher than that of the second interpolymer.

The first interpolymer can comprise from about 4 to about 25 percent by weight of the interpolymer product and the second interpolymer can comprise from about 75 to about 96 percent by weight of the interpolymer product.

The interpolymer products are preferably produced in a polymerization process using a multiple zone reactor in which at least one higher molecular weight ethylene interpolymer is produced in one zone of the reactor. The higher molecular weight zone of the reactor process produces from about 0.5% and to about 50 weight percent of the total interpolymer, preferably from about 4 weight percent to about 25 weight percent, and at least one other zone produces the remaining fraction of the total interpolymer product at a lower molecular weight sufficient to obtain the desired $I_2$ and/or $I_{10}/I_2$.

The weight average molecular weight (Mw) of the fraction of total interpolymer produced in the higher molecular weight zone is greater than about 300,000 grams/mole, preferably greater than about 400,000 grams/mole.

Alternatively, the interpolymer products are produced by blending at least two ethylene interpolymers to produce a polymer blend conforming to the above specifications.

There are several ways to manufacture the thermoplastic ethylene interpolymer products for use in this invention. U.S. Pat. No. 4,076,698, incorporated herein by reference, involves coordination catalysts of the "Ziegler" type or "Phillips" type and includes variations of the Ziegler type, such as the Natta type. These catalysts may be used at very high pressures, but may also (and generally are) used at very low or intermediate pressures. The products made by these coordination catalysts are generally known as "linear" polymers because of the substantial absence of branched chains of polymerized monomer units pendant from the main polymer "backbone." It is these linear polymers to which the present invention primarily pertains. Linear low density polyethylene (LLDFE) and ultra low density polyethylene (ULDPE) typically have a density between about 0.88 grams/milliliter (g/ml) and about 0.94 g/ml. The density of the polyethylene is lowered by copolymerizing ethylene with minor amounts of an alpha, beta-ethylenically unsaturated alkene(s) having from 3 to 18 carbons per alkene molecule (e.g., 1-propene, 1butene, 1-pentene, 4-methyl-1-pentene, 1-hexene, 1octene, 1,9-decadiene and 1,7-octadiene), preferably 4 to 8 carbon atoms (e.g., 1-butene, 1-hexene and 1octene) and most preferably 8 carbons per alkene molecule (i.e., 1-octene). The amount of the alkene comonomer is generally sufficient to cause the density of the linear low density polymer to be substantially in the same density range as low density polyethylene (LDPE), due to the alkyl side chains on the polymer molecule, yet the polymer remains in the "linear" classification; they are conveniently referred to as "linear low density polyethylene."

The use of coordination-type catalysts for copolymerizing ethylene with higher alkenes to make LLDPE and ULDPE copolymers having densities between about 0.88 g/ml and about 0.94 g/ml is disclosed variously in, e.g., U.S. Pat. No. 2,699,457; U.S. Pat. No. 2,846,425; U.S. Pat. No. 2,862,917; U.S. Pat. No. 2,905,645; U.S. Pat. No. 3,058,963; U.S. Pat. No. 4,076,698; and U.S. Pat. No. 4,668,752, incorporated herein by reference. The density of the interpolymer products used in making the films described herein is about 0.935 g/ml or less, preferably from about 0.92 g/ml to about 0.935 g/ml, and especially from about 0.925 g/ml to about 0.935 g/ml.

The molecular weight of the LLDPE useful in the present invention is indicated and measured by melt index according to ASTM D-1238, Condition (E) (i.e., 190° C./2 16 kilograms): also known as $I_2$. The $I_2$ of the thermoplastic ethylene interpolymer products used in the film is preferably from about 0.1 grams/10 minutes to about 4 grams/10 minutes, especially from about 0.1 grams/10 minutes to about 2 grams/10 minutes and particularly from about 0.1 grams/10 minutes to about 0.55 grams/10 minutes. Generally, the melt index of the interpolymer product is dictated by the type of film to be made. An extrusion coating process, for example, can use an interpolymer product having a melt index of about 10 grams/10 minutes, while a blown film process usually utilizes an interpolymer product having a melt index of about 0.5 grams/10 minutes.

The molecular weight distribution is indicated and measured by I10/I2 according to ASTM D-1238, Conditions (N) (190° C/10 kilograms) and (E), respectively. The melt flow ratio, I10/I2, of the thermoplastic interpolymer product useful in making the films is at least about 8, and preferably from about 8 to about 30. Molecular weight distribution variation can be achieved by many techniques, including varying catalytic conditions or reactor conditions.

Similar interpolymers can also be made by blending two or more polymers of the correct density and molecular weight, a method which would certainly be more expensive than producing the desired product directly in a single reactor or in multiple reactor zones. It is important, however, that the interpolymer(s) will be well mixed when using discrete interpolymer blends. When combining two or more interpolymers to make the interpolymer product for use in making the films of the present invention, either in discrete blends or in insitu polymerization, it is preferable that the higher molecular weight portion of the interpolymer product have a higher density than the remaining portion, as long as the final interpolymer product density is about 0.935 g/ml or less.

Alternatively, variations in many commercially active processes including slurry, gas phase, and autoclave processes may be able to produce interpolymers exhibiting low block and low coefficient of friction, provided that these processes are operated in a manner consistent to make the interpolymers having the properties described herein.

Other processes for making the LLDPE of the present invention can be separated into specific types such as high pressure, gas phase, slurry, solution process, and multiple catalyst systems. Such processing techniques are known to those skilled in the polymer art for making such "blends", including U.S. Pat. No. 4,438,238, which refers to films made from specified blends of two LLDPE resins.

U.S. Pat. No. 4,048,412, U.S. Pat. No. 4,269,948, U.S. Pat. No. 4,320,088, and U.S. Pat. No. 4,814,377 are process patents for high pressure Ziegler catalyst systems. U.S. Pat. No. 4,336,352, U.S. Pat. No. 4,414,369, U.S. Pat. No. 4,692,501, and U.S. Pat. No. 4,792,588 disclose slurry polymerization processes. U.S. Pat. No. 3,491,073, and U.S. Pat. No. 3,969,470 are solution polymerization process patents. U.S. Pat. No. 3,914,342 discloses another solution polymerization process whereby the ethylene and the comonomer(s) is polymerized in multiple reactors. U.S. Pat. No. 4,792,595, U.S. Pat. No. 4,874,820, U.S. Pat. No. 4,935,474, U.S. Pat. No. 4,937,299, and U.S. Pat. No. 4,939,217 disclose the use of multiple catalysts to polymerize ethylene with various commoners. All of the above United States Patents are incorporated herein by reference.

Antioxidants, pigments, hydrophobic and/or hydrophilic agents, etc., can be incorporated into the thermoplastic interpolymer products of the present invention, to the extent that they do not interfere with the blocking performance of the film. To this extent, other polymers, e.g., LDPE, can also be incorporated in minor amounts into the interpolymer products, as long as the polymers do not detrimentally affect the film forming ability or the blocking performance of the interpolymer product.

Thermoplastic Interpolymer Product Preparation

The interpolymer products of Examples 1-11 are produced in a solution polymerization process using a series, dual-zone or dual reactor) configuration. A representative schematic of the process in shown in FIG. 1.

The two reactor zones are designated as Zone A (1) and Zone B (2) in FIG. 1. A solvent mixture (3) of saturated $C_8$-$C_{10}$ hydrocarbons and 1-octene is fed to each zone via separate feed streams (4 and 5). Ethylene (6) and hydrogen (7) are each added to each feed stream independently. The reaction is initiated by injecting catalyst and cocatalyst (8) into both zones.

Ziegler catalyst can be prepared using a number of different methods. (A detailed description of one such method can be found in U.S. Pat. No. 4,547,475, incorporated herein by reference, including cocatalyst levels and stoichiometries for various metal loadings.) Each zone is agitated.

The polymer density is controlled by the 1-octene flow, the melt index is controlled by the total hydrogen flow, the ethylene conversion is controlled by the solvent flow, and Zone A is operated at significantly reduced hydrogen concentration to produce higher molecular weight polymer in this zone. Zone A is equipped with a sampling pot (also not shown) such that the contents of the reactor can be removed for further analysis.

Zone A is operated at temperatures of from about 140° C. to about 190° C. Zone B is operated at temperatures of from about 170° C. to about 215° C.

The interpolymer stream of Zone A is discharged to Zone B for further reaction, where it is combined with fresh ethylene and hydrogen. The total interpolymer product of Zones A and B exits Zone B (9) and is well mixed, purified and pelletized using conventional equipment (not shown).

Experimental

Eleven different thermoplastic ethylene/1-octene interpolymer products of the present invention are produced using the multiple reactor zone configuration shown in FIG. 1. Table 1 describes the physical properties of each of the example interpolymers, and of comparative resins A, B, and C made using a single reactor zone.

Molecular Weight Distribution Determination

Zone A is designed such that samples of interpolymer can be removed for direct analysis. Approximately 100 grams of the Zone A sample is removed for each of the Examples 1-11 for analysis (except Example 10 which was not collected because of a technical problem). The whole interpolymer samples and Zone A samples were analyzed by gel permeation chromatography (GPC) on a Waters 150C high temperature chromatographic unit equipped with three mixed porosity columns (Polymer Laboratories $10^3$, $10^4$, $10^5$, and $10^6$), operating at a system temperature of 140° C. The solvent is 1,2,4-trichlorobenzene, from which 0.3% by weight solutions of the samples are prepared for injection. The flow rate is 1.0 milliliter/minute and the injection size is 200 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in *Journal of Polymer Science*, Polymer Letters, Vol. 6, (621) 1968, incorporated herein by reference) to derive the equation:

$$M_{polyethylene} = a * (M_{polystyrene})^b$$

In this equation, a=0.4316 and b=1.0. Weight average molecular weight, Mw, is calculated in the usual manner according to the formula:

$$M_w = R\ w_i * M_i$$

where $w_i$ and $M_i$ and are the weight fraction and molecular weight respectively of the ith fraction eluting from the GPC column.

Table II contains the gel permeation chromatagraphy data for the interpolymer products of the present invention and for the comparative resins. The data include weight average molecular weight ($M_w$), number average molecular weight ($M_n$), $M_w/M_n$ and the amount of the interpolymer product having $M_w$ of at least about $1 \times 10^6$.

The conditions for Zone A described previously are intended to produce very high molecular weight polymer. Table IIA summarizes the molecular weight of the interpolymer Zone A samples. All of the calculated $M_w$'s for the Zone A interpolymer samples are in excess of 300,000 grams/mole. Though the whole polymer $M_w$'s for all the example resins were significantly higher than that of Resin B, the example interpolymer products processed more easily on the film fabrication equipment as shown in the Blown Film Fabrication Section, thus demonstrating an additional benefit of the present invention.

Blown Film Fabrication Conditions

The improved processing, broad MWD resins produced via the procedure above, as well as three comparative resins (Resins A, B, and C) are fabricated on an Egan blown film line using the following fabrication conditions:
2 inch extruder
3 inch die
30 mil die gap
25 RPM extruder speed
460° F. melt temperature
0.8 mil gauge
2.7:1 Blow up ratio (12.5 inches layflat)
12.5 inches frost line height The melt temperature is kept constant by changing the extruder temperature profile. Frost line height is maintained at 12.5 inches by adjusting the air flow. The extruder output rate, back pressure and amps are monitored and a complete summary of the fabrication data is shown in Table III.

Resins A and B are conventional single reactor polymers included herein for comparison. Resin C is similar to resin B, but with $SiO_2$ added as an antiblocking agent and erucamide added as a slip agent to reduce the coefficient of friction. For comparison, Table X summarizes data describing blocking force of commercially available resin made into film containing various levels of SiO2 (an antiblock agent). For the interpolymer product examples contained herein, which do not contain antiblock compounds, the blocking force is as low as about 6.5 grams. For comparative commercially available resins, about 7800 ppm of $SiO_2$ must be added to the resin (in film form) to reach a blocking force of about 6 grams. Also for comparison, Table XI contains data describing kinetic slip of commercially available resin made into film containing various levels of erucamide (a slip agent). For the interpolymer product examples contained herein, which do not contain slip compounds, the kinetic slip is as low as about 0.322. For comparative commercially available resins, about 500 ppm of erucamide must be added to the resin (in film form) to reach a kinetic slip of about 0.33.

Generally, the block of the film consisting essentially of the new interpolymer products is about 30 grams or less, preferably about 20 grams or less, and especially about 10 grams or less.

The improved processability of the new interpolymer products is evident by comparing the amps and back pressure of the eleven examples with those of resins A, B, and C.

Other types of film are within the scope of this invention, including cast film and extrusion coating film, but the block property of blown film is especially benefited by the invention. Blown film thickness can be from about 0.1 mils to about 1 mil or more, but is preferably between about 0.4 mils and about 0.8 mils. The film of the present invention can also be used as at least one outer layer of a multilayer film structure, in order to take advantage of the good block properties of the interpolymer product in the multilayer structure.

Film Performance

The films above are analyzed for various properties. Blocking force (measured according to ASTM D 3354, procedure A) and coefficient of friction (COF) (as measured using ASTM D 1894 procedure A or B) are measured for each film sample. Table IV summarizes block and slip film performance results for film made from each interpolymer and from the comparative polymers. The blown film fabricated from the example interpolymers clearly have lower block and lower COF than the comparative polymers. Generally, the kinetic coefficient of friction ranges from about 0.2 to about 0.45 for film made from the interpolymers of this invention, without additional additives.

Table V summarizes other film physical properties of the interpolymers and the comparative polymers. The complete film performance data show that the example interpolymers have comparable, if not better mechanical performance as compared to the comparative polymers, especially in the machine direction orientation. The data also show that additives used to enhance slip and block can detrimentally affect physical properties of the film (e.g., compare resin B to resin C).

The inventors have performed a detailed study of the surface morphologies of the films from the interpolymer film examples described herein using the optical reflectance technique of Nomarski interference contrast. This technique reveals that increased surface roughness is exhibited by those films comprising the present invention. Thus, the invention can also be perceived as a method of increasing surface roughness of at least one layer of a film.

The interpolymer product films of the present invention are useful as liners (e.g., institutional or consumer), merchandise bags, grocery sacks or "T-shirt" bags.

TABLE I

| | Resin Specifications | | | |
|---|---|---|---|---|
| Example | $I_2$ (g/10 min.) | $I_{10}/I_2$ | Weight fraction of the interpolymer product produced in Zone A | Density (g/ml) |
| 1 | 0.59 | 10.22 | 13.2 | 0.925 |
| 2 | 0.45 | 16.27 | 20.5 | 0.9292 |
| 3 | 0.38 | 13.45 | 20.4 | 0.9305 |
| 4 | 0.60 | 9.72 | 13.2 | 0.924 |
| 5 | 0.53 | 13.53 | 20.3 | 0.9204 |

TABLE I-continued

Resin Specifications

| Example | $I_2$ (g/10 min.) | $I_{10}/I_2$ | Weight fraction of the interpolymer product produced in Zone A | Density (g/ml) |
|---|---|---|---|---|
| 6 | 0.41 | 12.37 | 20.2 | 0.9203 |
| 7 | 0.52 | 9.27 | 4.68 | 0.9205 |
| 8 | 0.78 | 8.87 | 4.76 | 0.9204 |
| 9 | 0.60 | 9.82 | 13.07 | 0.9255 |
| 10 | 0.63 | 8.24 | 4.96 | 0.9298 |
| 11 | 0.82 | 8.33 | 4.86 | 0.9306 |
| Resin A | 1.05 | 8.00 | N/A | 0.9200 |
| Resin B | 0.66 | 7.14 | N/A | 0.9230 |
| Resin C* | 0.61 | 7.23 | N/A | 0.9271 |

N/A = Not applicable
*Resin C is similar to Resin B, but with 5000 ppm $SiO_2$ (anti-block) and 500 ppm Erucamide (slip) added.

TABLE II

GPC $M_n$, $M_w$ and MWD of the Interpolymer Products

| Example | $M_w$ | $M_n$ | $M_w/M_n$ | Weight percent of Interpolymer Product having $M_w > 1 \times 10^6$ |
|---|---|---|---|---|
| 1 | 160000 | 37900 | 4.22 | 2.42 |
| 2 | 171000 | 31900 | 5.36 | 3.89 |
| 3 | 193000 | 33800 | 5.17 | 3.59 |
| 4 | 167000 | 33300 | 5.02 | 2.29 |
| 5 | 181000 | 29200 | 6.20 | 3.4 |
| 6 | 189000 | 32400 | 5.83 | 3.27 |
| 7 | 151000 | 34200 | 4.42 | 1.12 |
| 8 | 141000 | 33900 | 4.16 | 1.05 |
| 9 | 156000 | 32000 | 4.88 | 1.12 |
| 10 | 144000 | 37200 | 3.87 | 0.9 |
| 11 | 135000 | 38200 | 3.53 | 0.78 |
| Resin A | 114000 | 32100 | 3.55 | 0.39 |
| Resin B | 130000 | 39500 | 3.29 | 0.11 |
| Resin C** | 129000 | 38700 | 3.33 | NM |

NM = Not measured
**Resin C is similar to Resin B, but with 5000 ppm $SiO_2$ (anti-block) and 500 ppm Erucamide (slip) added.

TABLE IIA

GPC Mw and MWD of the Zone A Samples

| Example | $M_w$ Zone A | $M_n$ Zone A | $M_w/M_n$ Zone A |
|---|---|---|---|
| 1 | 517000 | 92800 | 5.57 |
| 2 | 395000 | 67800 | 5.83 |
| 3 | 570000 | 96700 | 5.89 |
| 4 | 513000 | 106000 | 4.84 |
| 5 | 515000 | 127000 | 4.06 |
| 6 | 724000 | 108000 | 6.70 |
| 7 | 676000 | 108000 | 6.26 |
| 8 | 633000 | 126000 | 5.02 |
| 9 | 377000 | 103000 | 3.66 |
| 10 | * | * | * |
| 11 | 605000 | 142000 | 4.26 |
| Resin A | N/A | N/A | N/A |
| Resin B | N/A | N/A | N/A |
| Resin C** | N/A | N/A | N/A |

N/A = Not applicable
*No Zone A fraction collected
**Resin C is similar to Resin B, but with 5000 ppm $SiO_2$ (anti-block) and 500 ppm Erucamide (slip) added.

TABLE III

Blown Film Fabrication Processing Data

| Example | Output Rate (lbs/hr) | Pressure (Psi) | Amps |
|---|---|---|---|
| 1 | 34.0 | 4027 | 50 |
| 2 | 31.3 | 3080 | 41 |

TABLE III-continued

Blown Film Fabrication Processing Data

| Example | Output Rate (lbs/hr) | Pressure (Psi) | Amps |
|---|---|---|---|
| 3 | 29.3 | 3740 | 45 |
| 4 | 33.9 | 4048 | 53 |
| 5 | 32.5 | 3320 | 45 |
| 6 | 27.4 | 3706 | 50 |
| 7 | 30.8 | 4134 | 55 |
| 8 | 31.9 | 3575 | 52 |
| 9 | 32.2 | 3950 | 49 |
| 10 | 33.1 | 4444 | 54 |
| 11 | 33.4 | 3908 | 50 |
| Resin A | 34.7 | 3550 | 54 |
| Resin B | 34.3 | 3640 | 55 |
| Resin C | 33.5 | 4360 | 56 |

Note
Resin B was fabricated at 520° F.
Resin C was fabricated at 500° F.

TABLE IV

Blown Film Block and Slip

| Example | Block (g) | Static Slip (COF) | Kinetic Slip (COF) |
|---|---|---|---|
| 1 | 8.5 | 0.444 | 0.440 |
| 2 | 7.8 | 0.364 | 0.388 |
| 3 | 8.8 | 0.304 | 0.322 |
| 4 | 10.8 | 0.372 | 0.438 |
| 5 | 10.8 | 0.470 | 0.322 |
| 6 | 16.0 | 0.468 | 0.366 |
| 7 | 24.3 | 0.540 | 0.348 |
| 8 | 27.0 | 0.530 | 0.356 |
| 9 | 7.5 | 0.396 | 0.416 |
| 10 | 8.8 | 0.384 | 0.390 |
| 11 | 6.5 | 0.398 | 0.424 |
| Resin A | 46.3 | 0.707 | 0.822 |
| Resin B | 66.5 | 0.704 | 0.600 |
| Resin C* | 7.5 | 0.290 | 0.324 |

*Resin C is similar to Resin B, but with 5000 ppm $SiO_2$ (anti-block) and 500 ppm Erucamide (slip) added.

TABLE V

Blown Film Properties

| Example | MD 2% Secant Modulus (psi) | DC 2% Secant Modulus (psi) | MD Yield Strength (psi) | CD Yield Strength (psi) |
|---|---|---|---|---|
| 1 | 29833 | 31066 | 1899 | 1981 |
| 2 | 36191 | 38919 | 2040 | 2160 |
| 3 | 35451 | 45991 | 2183 | 2469 |
| 4 | 26252 | 32709 | 1774 | 1920 |
| 5 | 23661 | 24846 | 1602 | 1664 |
| 6 | 24138 | 29880 | 1667 | 1657 |
| 7 | 24919 | 23497 | 1574 | 1683 |
| 8 | 25057 | 27997 | 1779 | 1794 |
| 9 | 27567 | 34922 | 1894 | 2046 |
| 10 | 31799 | 45064 | 1990 | 2306 |
| 11 | 39090 | 49656 | 2398 | 2541 |
| Resin A | 22099 | 27249 | 1613 | 1752 |
| Resin B | 26200 | 28887 | 1874 | 1881 |
| Resin C | 26659 | 26163 | 1716 | 1796 |

Note
Resin B was fabricated at 520° F.
Resin C was fabricated at 500° F.
MD = Machine Direction
CD = Cross Direction

TABLE VI

Blown Film Properties

| Example | MD Tensile Strength (psi) | CD Tensile Strength (psi) | MD Elongation (%) | CD Elongation (%) |
|---|---|---|---|---|
| 1 | 8638 | 5234 | 514 | 693 |
| 2 | 9798 | 4391 | 509 | 749 |

TABLE VI-continued

Blown Film Properties

| Example | MD Tensile Strength (psi) | CD Tensile Strength (psi) | MD Elongation (%) | CD Elongation (%) |
|---|---|---|---|---|
| 3 | 11551 | 6092 | 476 | 741 |
| 4 | 8716 | 5465 | 543 | 703 |
| 5 | 8538 | 5649 | 595 | 823 |
| 6 | 10133 | 6573 | 520 | 770 |
| 7 | 8343 | 6835 | 543 | 693 |
| 8 | 7467 | 5306 | 547 | 642 |
| 9 | 8496 | 5307 | 543 | 751 |
| 10 | 7140 | 5884 | 590 | 717 |
| 11 | 6995 | 5711 | 597 | 724 |
| Resin A | 6139 | 6698 | 573 | 679 |
| Resin B | 6839 | 7516 | 593 | 744 |
| Resin C | 6133 | 4810 | 538 | 631 |

Note
Resin B was fabricated at 520° F.
Resin C was fabricated at 500° F.

TABLE VII

Blown Film Properties

| Example | MD Toughness (ft-lbs) | CD Toughness (ft-lbs) | 45 Degree Gloss | Clarity | Haze |
|---|---|---|---|---|---|
| 1 | 1750 | 1402 | 44.9 | 10.35 | 14.44 |
| 2 | 2420 | 1401 | 8.7 | 0.25 | 64.83 |
| 3 | 2213 | 1723 | 12.9 | 0.75 | 51.10 |
| 4 | 1758 | 1446 | 32.5 | 22.40 | 21.85 |
| 5 | 1928 | 1627 | 14.2 | 2.12 | 46.44 |
| 6 | 2017 | 1678 | 14.3 | 1.50 | 46.80 |
| 7 | 1437 | 1543 | 27.4 | 8.30 | 25.40 |
| 8 | 1379 | 1279 | 43.8 | 29.70 | 16.40 |
| 9 | 1683 | 1522 | 27.5 | 17.60 | 25.10 |
| 10 | 1442 | 1618 | 44.5 | 30.90 | 15.60 |
| 11 | 1607 | 1622 | 58.3 | 46.10 | 10.72 |
| Resin A | 1214 | 1523 | 51.7 | 53.65 | 10.35 |
| Resin B | 1444 | 1817 | 74.4 | 80.50 | 4.19 |
| Resin C | 1193 | 1238 | 67.8 | 18.67 | 10.08 |

Note
Resin B was fabricated at 520° F.
Resin C was fabricated at 500° F.

TABLE VIII

Blown Film Properties

| Example | MD Elmendorf Tear (g) | CD Elmendorf Tear (g) | MD PPT (lbs) | CD PPT (lbs) |
|---|---|---|---|---|
| 1 | 130 | 458 | 4.55 | 7.28 |
| 2 | 85 | 555 | 5.17 | 7.40 |
| 3 | 51 | 432 | 4.59 | 6.54 |
| 4 | 301 | 397 | 5.77 | 7.04 |
| 5 | 210 | 453 | 5.43 | 7.31 |
| 6 | 237 | 475 | 5.51 | 6.63 |
| 7 | 264 | 330 | 5.54 | 6.38 |
| 8 | 258 | 378 | 5.34 | 6.13 |
| 9 | 202 | 402 | 5.98 | 7.19 |
| 10 | 147 | 378 | 5.62 | 6.77 |
| 11 | 102 | 296 | 5.21 | 6.47 |
| Resin A | 249 | 286 | 5.10 | 5.55 |
| Resin B | 275 | 336 | 5.30 | 5.54 |
| Resin C | 221 | 366 | 5.93 | 6.36 |

Note
Resin B was fabricated at 520° F.
Resin C was fabricated at 500° F.

TABLE IX

Blown Film Properties

| Example | Dart Impact (grams) | Puncture (ft-lbs/cu. in) |
|---|---|---|
| 1 | 112 | 214 |
| 2 | 69 | 155 |
| 3 | 67 | 166 |
| 4 | 133 | 223 |
| 5 | 131 | 160 |
| 6 | 188 | 217 |
| 7 | 608 | 266 |
| 8 | 212 | 185 |
| 9 | 116 | 205 |
| 10 | 110 | 178 |
| 11 | 78 | 144 |
| Resin A | 266 | 244 |
| Resin B | 431 | 248 |
| Resin C | 191 | 122 |

Note
Resin B was fabricated at 520° F.
Resin C was fabricated at 500° F.

TABLE X

Induced Block v. SiO$_2$ content

| SiO$_2$ content (ppm) | Induced Block (grams) |
|---|---|
| 0 | 65 |
| 1000 | 25 |
| 3000 | 15 |
| 5000 | 8 |
| 7500 | 6 |

TABLE XI

Kinetic Slip v. Erucamide content

| Erucamide content (ppm) | Kinetic Slip (COF) |
|---|---|
| 0 | 0.6 |
| 100 | 0.55 |
| 230 | 0.475 |
| 400 | 0.39 |
| 500 | 0.33 |

What is claimed is:

1. In a method of preparing a film having a blocking force of about 30 grams or less without adding antiblock agents from interpolymer product pellets having a melt flow ratio, $I_{10}/I_2$, from about 8 to about 30, and a density of about 0.935 grams/milliliter or less, comprising the steps of:

a) polymerizing ethylene and at least one alpha-olefin in at least one higher molecular weight zone or a reactor at temperatures and pressures sufficient to produce a polymer, b) interpolymerizing ethylene and at least one alpha-olefin in at least one other zone of a reactor at temperatures and pressures sufficient to produce an interpolymer having a lower molecular weight than the first polymer, c) combining the polymer from (a) with the interpolymer of (b) to form an interpolymer product containing (a) in an amount from about 0.5% up to about 50%, d) extruding the interpolymer product into pellets, and e) extruding the pellets of (d) into film, the improvement comprising selecting an ethylene interpolymer product having:

(i) a weight average molecular weight less than or equal to about 200,000, (ii) at least about 0.5 percent to about 4 percent by weight of the interpolymer product has a weight average molecular weight of at least about 1,000,000 grams/mole, and (iii) wherein at least one component of the interpolymer product has a $M_w/M_n$ value of greater than about 3.

2. The improvement of claim 1 wherein the interpolymer product has a melt flow ratio, $I_{10}/I_2$, of from about 8 to about 20.

3. The improvement of claim 1, wherein the ethylene interpolymer product comprises:

(a) from about 4 to about 25 percent by weight of the interpolymer product of a first high molecular weight interpolymer of ethylene and at least one $C_3$–$C_{18}$ alpha-olefin having a weight average molecular weight greater than about 300,000 grams/mole, and (b) from about 75 to about 96 percent by weight of the interpolymer product of a second ethylene interpolymer.

4. The improvement of claim 3 wherein the first ethylene interpolymer comprises an interpolymer of ethylene and 1-octene and wherein the second ethylene interpolymer product comprises an interpolymer of ethylene and 1-octene.

5. The improvement of claim 4 wherein the first ethylene interpolymer has a density higher than that of the second ethylene interpolymer.

6. The improvement of claim 5 wherein the ethylene interpolymer product has a melt index, $I_2$, from about 0.1 grams/ 10 minutes to about 4 grams/10 minutes.

* * * * *